Aug. 30, 1966   S. S. SCHNELL   3,270,329
OVERLOAD DETECTOR FOR AUTOMATIC EQUIPMENT
Filed Dec. 24, 1963
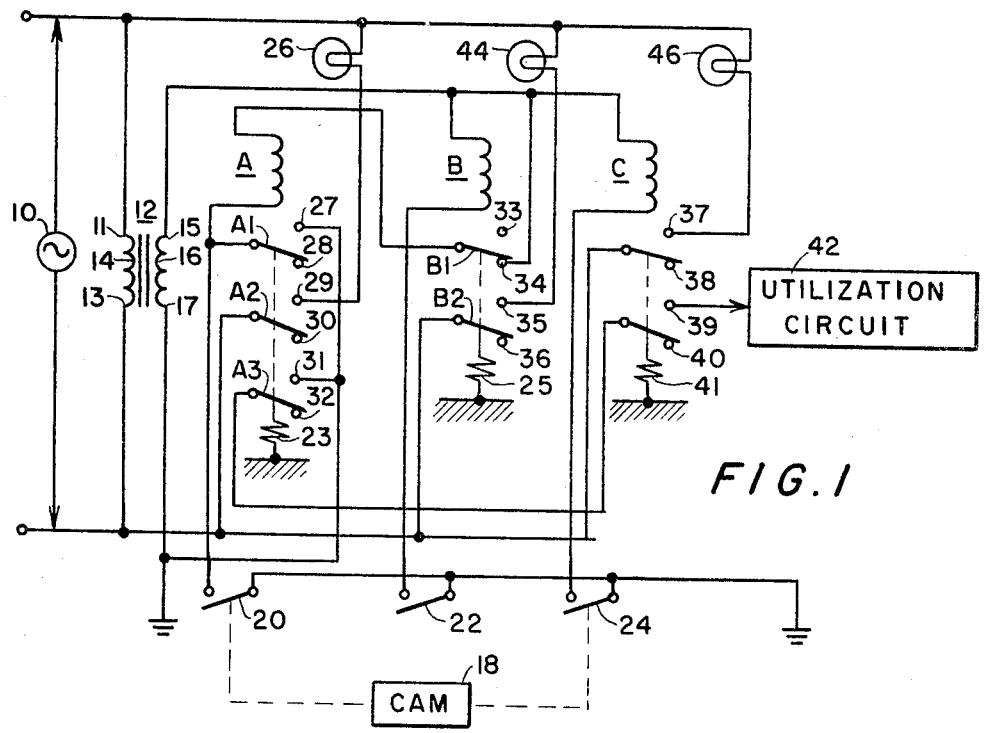
FIG. 1
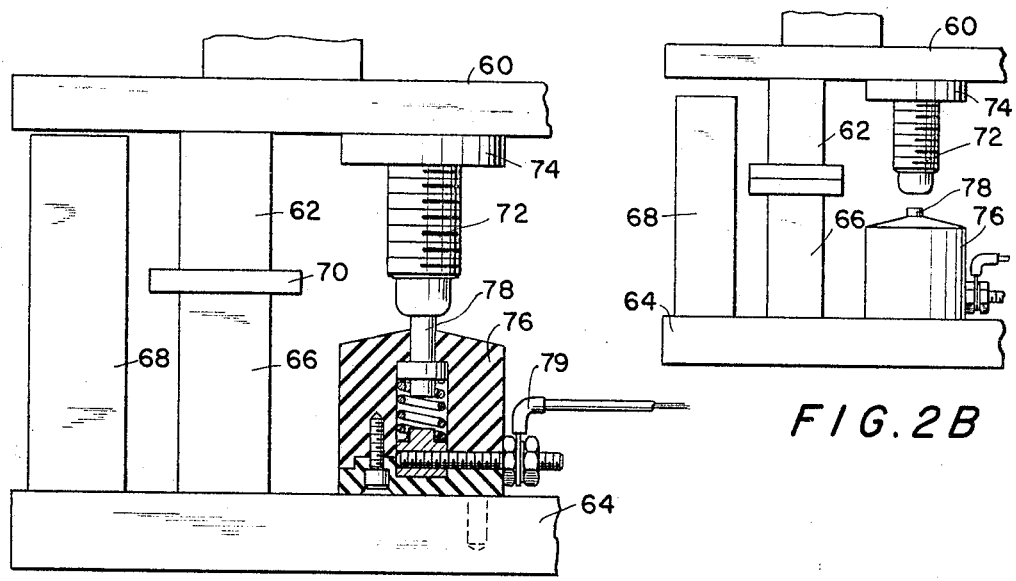
FIG. 2A
FIG. 2B
INVENTOR.
SOLOMON S. SCHNELL
BY
ATTORNEY United States Patent Office 3,270,329
Patented August 30, 1966

3,270,329
OVERLOAD DETECTOR FOR AUTOMATIC
EQUIPMENT
Solomon S. Schnell, New York, N.Y.
(225—20 Menton Ave., Laurelton, N.Y.)
Filed Dec. 24, 1963, Ser. No. 333,092
5 Claims. (Cl. 340—223)

This invention relates to control circuits. More particularly, it relates to a circuit for detecting mishaps in electrically powered mechanical equipment and for controlling such equipment in response thereto.

In the patent application of Solomon S. Schnell, for Automatic Equipment Control, Serial No. 109,301, filed May 11, 1961, there is disclosed a system for controlling electrically powered machinery in response to mishaps thereto in which the occurrence of such mishap rapidly halts the running of the machinery. The aforesaid application discloses both a system for controlling machinery in which a solenoid associated with the machinery may be in the energized or in the de-energized state during normal operation. The system includes a pair of indicating lights which are illuminated respectively when the machinery is running normally or when its operation is interrupted by the occurrence of a mishap.

It has been found that there is a need for a control system for not only responding rapidly to the occurrence of a mishap to accomplish its control function but also the requirement that the control system be capable of and adaptable to responding to varying clearances and thickness, and to parts being worked on failing to be properly ejected from such type machine. For example, such tolerances may be concerned with the degree of spacing between a pair of opposed dies such as males and females, or upper and lower dies or the thickness of material being operated on by the machinery.

It has also been found that it is desirable for the indicating arrangement associated with such overload systems to have a logical sequence of operation to thereby provide a visual aid to the machinery operator and to enable the effecting of a substantially immediate diagnosis of the cause and the location of the mishap.

Accordingly, it is an important object of this invention to provide control means adaptable to and capable of responding to varying tolerances and thicknesses which gives an indication of a malfunction of the controlled equipment substantially instantaneously and substantially simultaneously halts the operation of such equipment.

It is a further object to provide control means in accordance with the preceding object which includes an indicating arrangement for enabling rapid diagnosis of a malfunction of the equipment being installed.

Generally speaking, and in accordance with the invention there is provided a system adapted to be connected to a potential source for halting the operation of an electrically powered machine whose operation is dependent upon the state of an element capable of being in an electrically energized or de-energized state in response to an overload in the machine. The system comprises a cam, first and third switches associated with the cam, and a second switch associated with the overload, each of the switches having one of their terminals grounded at the machine, the switches being adapted to be sequentially closed in each cycle of revolution of the cam, the second switch being closed only in the absence of the overload. There are further included in the system, first, second and third electromagnetic relays. Each having one of their terminals connected to the other terminal of the first, second and third switches respectively, a first plurality of ganged contacts being associated with the first relay, a second plurality of ganged contacts being associated with the second relay, a third plurality of ganged contacts being associated with the third relay, one of the contacts of each of the first and third pluralities respectively being connected together, and first, second and third lamps. Upon the applying of potential from the source to the relays, and, with the rotation of cam, the closing of the first switch causes the energization of the first relay to switch the positions of its contacts, to illuminate the first lamp, to lock the first relay and the first lamp in circuit with the source and to connect the aforesaid one contact of the first plurality to ground; the closing of the second switch causes the energization of the second relay to switch the positions of its contacts to illuminate the second lamp and to concurrently disconnect the first relay and the first lamp from the source; the closing of the third switch causes the energization of the third relay to switch the positions of its contacts to illuminate the third lamp. The failure of the second switch to close because of an overload or a missing part prevents the energization of the second relay whereby the second lamp is not illuminated and the first relay and first lamp remain locked in circuit with the source, ground potential consequently being applied to the contacts of the aforesaid ones of the first and third pluralities of contacts to switch the state of the element and thereby halt the operation of the machine.

The features of this invention which are believed to be new are set forth with particularity in the appended claims. The invention itself, however, may best be understood by reference to the following description when taken in conjunction with the accompanying drawings which show an illustrative embodiment of a control system according to the invention.

In the drawings:

FIG. 1 is a schematic diagram of a control system constructed in accordance with the principles of the invention; and FIGS. 2A and 2B are diagrams illustrating a sensor assembly suitably utilized in the system of FIG. 1 and its mode of operation.

Referring now to FIG. 1, wherein there is shown a system constructed in accordance with the principles of the invention, the output of an AC source 10 which may suitably be the line voltage is applied to a transformer 12 comprising a primary winding 14 and a secondary winding 16. A cam switch arrangement which comprises a cam 18 adapted to be rotated by a rotating member of the machine to be controlled and that is synchronous with the operation has associated therewith switches 20 and 24, the rotors of switches 20 and 24 being connected to ground at the electrically powered machinery being controlled. A switch 22 is not connected to the cam. It is suitably a specially constructed switch situated between opposing members such as upper and lower, or male and female member of the operating part of the machine being controlled.

Secondary winding 16 has one terminal, 17, connected to ground at the chassis of the circuit and its other terminal, 15, connected to one terminal of the operating coils respectively of relays B and C. The other terminal of relay coil A is connected to the fixed pole of switch 20. Associated with relay C is a first contact C1 having a terminal, 37, associated therewith connected to end 11 of primary winding 14 through an indicating lamp 26 and terminal, 38. Also associated with relay C is a contact C2 mechanically ganged with contact C1 and suitably latched by a spring 41. An unconnected terminal 40 is associated with contact C2 and another terminal, 39, associated with contact C2 is connected to a utilization circuit 42 which effects the operation of the electrically powered machinery being controlled. Contact C2 is connected to contact A3 associated with relay A, the operation of which will be further described hereinbelow.

Relay B has one of its ends connected to secondary winding 16, and its other end connected to the fixed pole of switch 22. Associated with relay B, is a contact B1 connected to the operating coil of relay A. A terminal 34 associated with contact B1 is connected to end 15 of secondary winding 16, and a terminal 33 associated with contact B1 is unconnected. Also, associated with relay B and ganged with contacts B1 is a contact B2 suitably spring latched by a spring 25, contact B2 being connected to end 13 of primary winding 14. A terminal 34 associated with contact B2 is connected to end 11 of primary winding 14 through an indicating light, 44, terminal 36 also associated with contact B2 being an unconnected terminal.

Relay A has associated therewith a first, contact A1 connected thereto, a terminal 27 associated therewith being connected to the circuit chassis ground. Another terminal 28 associated with contact A1 is unconnected. Also associated with relay A is a contact A2 connected to end 13 of primary winding 11, a terminal 29 associated with contact A2 being connected to end 11 of primary winding 14 through an indicating lamp 26, another terminal 30 associated with contact A2 being unconnected. Further associated with relay A is a contact A3 which, as stated hereinabove, is connected to contact C2 associated with relay C. A terminal 31 associated with contact A3 is connected to terminal 27, i.e., chassis ground, and a terminal 32 associated with contact 11 is unconnected. Contacts A1, A2, A3 are also suitably mechanically ganged and suitably latched by means of a spring 23.

In considering the operation of the circuit, when the machine being controlled is functioning properly, during a cycle of rotation of cam 18 and the machine, switch 20 is first closed to effect the energization of relay A from the upper end 15 of secondary winding 16 through terminal 34, contact B1, the operating coil of relay A and the fixed pole of switch 20. Consequently, the contacts associated with relay A switch their positions to effect the illumination of lamp 26 and to lock in the operating coil of relay A and lamp 26 into circuit with the A.C. source. Next during the cycle of machine rotation, when switch 22 is closed, a circuit is completed to ground from secondary winding 16 through the operating coil of relay B and switch 22 to energize relay B. Consequently the contacts associated with relay B switch their positions to effect the illumination of indicating lamp 44 and to disconnect relay A and lamp 26 from circuit. It is realized that switch 20 is opened during the cam's rotation before switch 22 is closed.

Now, as the machine (plus cam) proceeds in its cycle of revolution, switch 22 opens disconnecting lamp 44 from circuit as well as coil B and when switch 24 is closed the operating coil of relay C is energized to effect the illumination of lamp 46. At this time, since contact A3 associated with relay A has resumed its normally open position, the circuit connection to ground appears at terminal 39. Indicating lamp 46, of course, is extinguished as soon as switch 24 opens during the rotation cam 18, relay C and lamp 46, not having circuit lock-in contacts associated therewith. In this manner, in normal operation of the machinery being controlled, as cam 18 rotates and if the operation of switch 22 is synchronized therewith, lamps 26, 44 and 46 are sequentially turned on and then extinguished. In connection with the foregoing description of the operation of the circuit, it is to be realized that switch 22 is so adjusted that it will close provided the thickness of the material being handled by the machined being controlled or the spacing tolerance of the machine is of the desired value.

Now, let it be assumed that thickness or tolerance is greater than the desired value. In such situation, switch 22 is not closed during a cycle of revolution of cam 18. Accordingly, switch 22 may suitably be designated as the overload detector switch.

In the operation of the circuit when an overload exists, as the cam 18 rotates, switch 20 is first closed to energize relay A and effect the illumination of light 26. Now during the cycle of rotation of the cam, when it is the turn of switch 22 to be closed by the operating members of the machine such closing does not occur whereby relay B is not energized, relay A is not de-energized, its contacts remain in their energizing position and light 26 remains illuminated. Continuing the cycle of revolution of cam 18, when the operating coil of relay C is energized to effect the illumination of the lamp, 46, with the switching of the positions of the contacts associated therewith, the connection to ground through contacts C2 and A3 appears at terminal 39. This ground is applied to the utilization circuit. In the utilization circuit, the ground may be one such as to de-energize a solenoid whose energized state is necessary for the running of the machine being controlled or to energize a solenoid whose de-energized state is necessary for the running of the machine.

From the foregoing, it is seen that the circuit of the invention provides an arrangement for substantially simultaneously halting the operation of a machine where an overload or underload occurs and includes an indicating system wherein the proper functioning of the controlled machine requires the sequential illumination of a given combination of indicating lamps. A malfunction due to an overload or a missing part is immediately detectable by the failure to illuminate of lamp 44 associated with relay B and switch 22 and the failure to extinguish of lamp 26.

Referring now to FIGS. 2A and 2B wherein there is shown a sensor assembly suitable for use in the system of FIG. 1 and incorporating switch 22 thereof, for convenience, it is shown as being utilized with a punch press. The punch press suitably comprises a punch holder 60 having a punch 62 thereon and die holder 64 having a die 66 and a material stop block 68 thereon. The material to be worked on and having a given single thickness 70 is disposed between punch 62 and die 66. The sensor assembly comprises a micrometer type adjustable screw 72 which threadedly engages a bracket 74, bracket 74 being suitably affixed to punch holder 60. A housing, 76, suitably comprising an insulating material is affixed to die holder 64 and has disposed therein a spring loaded plunger 78, which is adapted to make intimate contact with a conductor that places the plunger in circuit. FIG. 2A shows the arrangement when the material to be worked on has a single thickness. In this situation, screw 72, first is positioned so that it first makes contact with plunger 78. FIG. 2B shows the situation where the material being worked on has two thicknesses and where screw 72 has been positioned such that only a single thickness material is intended to be worked on. In such situation, i.e., the overload situation, screw 72 does not make contact with plunger 78.

In considering the operation of the sensor assembly, as the machine proceeds in a cycle of operation, at the time that switch 22 is to close, screw 72 makes contact with plunger 78 whereby the circuit is completed to ground through plunger 78, screw 72, and punch holder 60, the latter providing the ground potential source. Thus, effectively the closed position of switch 22 of the system of FIG. 1 is provided by the contact or screw 72 and plunger 78. Where there is an overload such contact, of course, is not effected and switch 22 of FIG. 1 does not close. Conductor 79 in FIGS. 2A and 2B corresponds in FIG. 1 to the lead from the operating coil of relay B to switch 22.

While there has been shown a particular embodiment of this invention, it will, of course, be understood that it is not intended to be limited thereto since many modifications both in the circuit arrangement and in the instrumentalities employed therein may be made and it is, therefore, contemplated by the appended claims to cover any such modification as fall within the true spirit and scope of the invention.

What is claimed as new and desired to be secured by Letters Patent of the United States is:

1. A system adapted to be connected to a potential source for halting the operation of an electrically powered machine, whose operation is dependent upon the state of an element capable of being in an electrically energized or in a de-energized state, in response to an overload in said machine comprising a rotatable cam, first and third switches associated with said cam, each of said switches having one of their terminals grounded at said machine, said switches being adapted to be sequentially closed in each cycle of revolution of said cam, a second switch associated with said machine being closed only in the absence of said overload, first, second and third electromagnetic relays having one of their terminals connected to the other terminal of said first, second and third switches respectively, a first plurality of ganged contacts associated with said first relay, a second plurality of ganged contacts associated with said second relay, a third plurality of ganged contacts associated with said third relay, one of the contacts of each of said first and third pluralities respectively being connected together, first, second and third lamps, means for applying potentials from said source to said relays, the closing of said first switch during the rotation of the cam causing the energization of said first relay to switch the positions of its contacts to illuminate said first lamp, to lock said first relay and said first lamp in circuit with said source and to connect said one contact of said first plurality to ground, the closing of said second switch causing the energization of said second relay to switch the positions of its contacts to illuminate said second lamp and to concurrently disconnect said first relay and said first lamp from said source, the closing of said third switch causing the energization of said third relay to switch its contacts to illuminate said third lamp, the failure to close of said second switch due to said overload preventing the energization of said second relay whereby said second lamp is not illuminated and said first relay and first lamp remain locked in circuit with said source, said ground potential being applied through said one contact of said first and third pluralities to said machine to switch the state of said element and thereby to halt the operation of said machine.

2. A system as defined in claim 1, wherein said mean for applying potential from said source comprizes a transformer having a primary winding and a secondary winding and wherein each of said contacts have associated therewith a normally open terminal to which the contact is connected when its associated relay is in the deenergized state and a closed terminal to which a contact is connected when its associated relay is in the energized state.

3. A system as defined in claim 2, wherein said first plurality comprises first, second and third contacts, normally closed terminals of said first and third contacts being connected to ground potential and wherein said first indiacting lamp is connected between said primary winding and a normally closed terminal of said second contact and wherein said second plurality comprises first and second contacts, the normally open contact of said first contact of said second plurality being connected to said secondary winding, said second indicating lamp being connected between said primary winding and a normally closed terminal associated with said second contact, said first relay being connected between its first associated contact and the first contact of said second plurality, said second relay being connected through said secondary winding.

4. A system as defined in claim 3, wherein said third plurality comprises first and second contacts said third indicating lamp being connected between said primary winding and the normally closed terminals of the first contact of said third plurality, the normally closed terminal of the second contact of said third plurality being connected to said machine.

5. A system as defined in claim 4, wherein said contacts comprising said first, second and third pluralities respectively are spring latched in their normally open state.

References Cited by the Examiner
UNITED STATES PATENTS 2,206,827 7/1940 Prince _____ 340—223
2,508,051 5/1950 Warren et al. _____ 33—143

NEIL C. READ, *Primary Examiner.*

R. ANGUS, *Assistant Examiner.*